Figure 1:
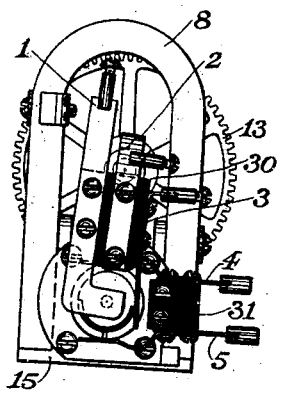

No. 879,425. PATENTED FEB. 18, 1908.
H. TIDEMAN.
ELECTRIC GENERATOR FOR TELEPHONE LINES.
APPLICATION FILED JAN. 16, 1905.

2 SHEETS—SHEET 1.

Witnesses:
Hazael C. Prado
Samuel G. McMeen

Henry Tideman,
Inventor.

by Kempster B. Miller
Attorney

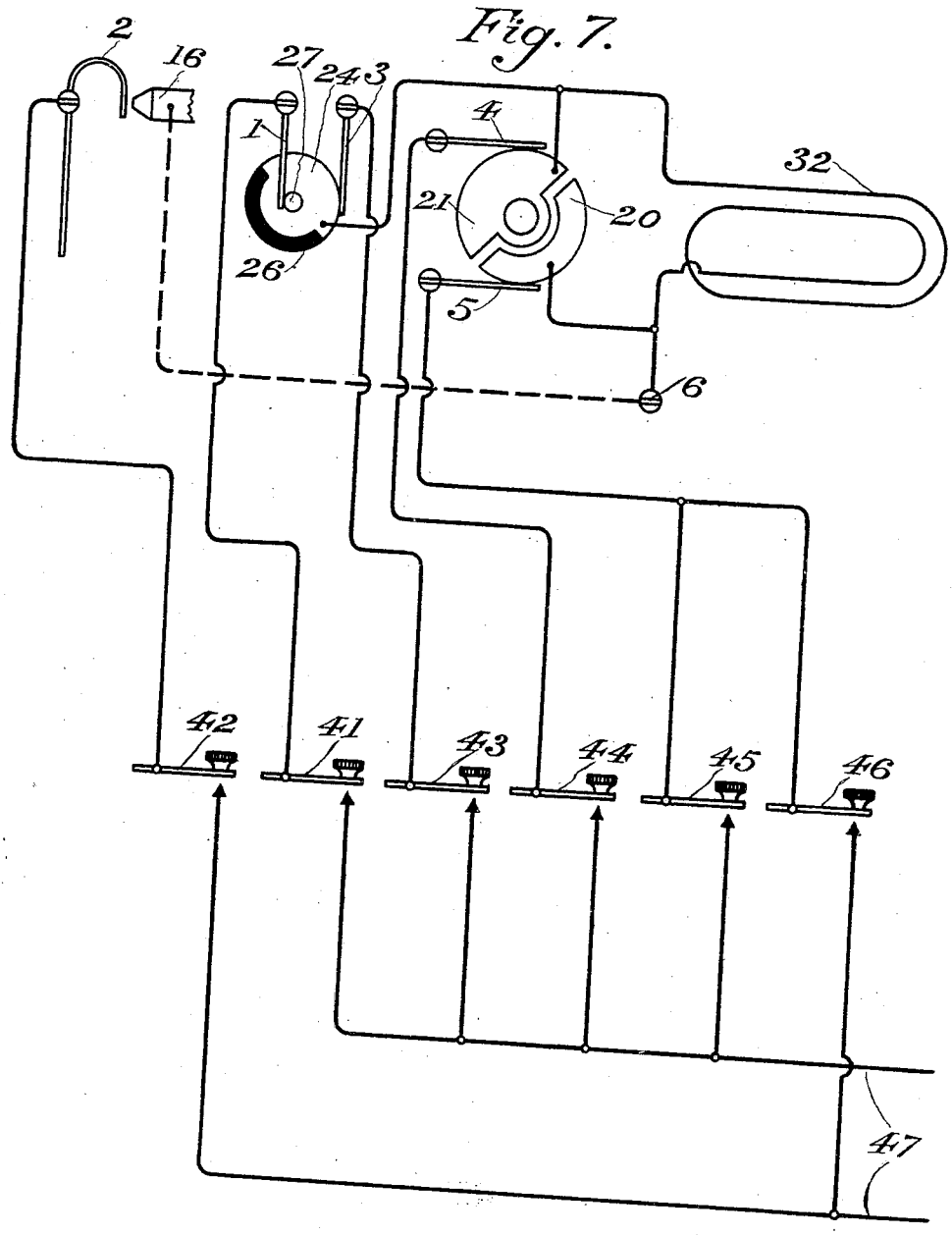

UNITED STATES PATENT OFFICE.

HENRY TIDEMAN, OF MENOMINEE, MICHIGAN.

ELECTRIC GENERATOR FOR TELEPHONE-LINES.

No. 879,425.

Specification of Letters Patent.

Patented Feb. 18, 1908.

Application filed January 16, 1905. Serial No. 241,220.

*To all whom it may concern:*

Be it known that I, HENRY TIDEMAN, a citizen of the United States of America, and a resident of Menominee, county of Menominee, and State of Michigan, have invented a new and useful Improvement in an Electric Generator for Telephone-Lines, of which the following is a specification.

My invention lies within that class of electric generators for telephone lines in which an armature containing iron and turns of wire, is rotated on its axis in a magnetic field. This magnetic field may be produced by the use of permanent magnets, or by means of electro-magnets deriving their exciting current from the rotated armature winding, or from some external source of current. In the class to which my invention belongs, the use of the permanent form of magnets is the more common, and I illustrate that method of producing the magnetic field.

It has long been common practice in the working of telephone lines to use electric generators in connection with both subscribers' telephones and central office equipments. In the former instance the object of such equipment is to enable the subscriber to send over the line more powerful currents than he could produce by means of the local battery otherwise necessary for his telephone, the object of sending such currents being to operate signal bells at other stations, or some form of electromagnetic signal in a central office. The customary form of generator at the subscriber's station is for giving an alternating current, and it is quite usual for these generators to be driven by hand power. When used in a central office, generators producing alternating current are quite common, as telephones having signal bells adapted to respond to alternating currents, are in common use. For party line purposes, however, there is now a wide use of signal bells adapted to respond to pulsating currents of low frequency, and of but one direction. Certain of these bells are adapted to respond to pulsating currents in one direction, and others to the currents in the opposite direction. Some similar forms of party lines are adapted to enable any station, by sending out such uni-directional pulsating currents, to call any desired party on the same line.

The pulsating current to which these party line bells are adapted to respond is of a frequency similar to that of the alternating current ordinarily employed, this being somewhere in the neighborhood of sixteen cycles per second. If an alternating current of this frequency be so carried through a commutator as to omit each alternate half cycle, the remaining series of half cycles of similar polarity is a current suitable for the purpose. In certain other forms of telephone and telegraph signaling, and of testing lines, and in the charging of small storage batteries, it is of advantage to have the current from a small generator so corrected by a commutator as to preserve both halves of each cycle, but correcting them in direction so as to utilize the energy all in one direction.

My invention enables one device to produce alternating current within its armature, and to deliver it from suitable terminal points in either an alternating current, a uni-directional current in one direction, the armature winding being short-circuited during each undesired half cycle, a uni-directional current in the opposite direction with the armature winding short-circuited during each undesired half cycle, a uni-directional current in one direction with the circuit opened during each undesired half cycle, a uni-directional current in the opposite direction with the circuit opened during each undesired half cycle, or a current in one direction composed of the alternating current developed in the armature, rectified by the commutator to flow always in the same direction.

In certain arrangements of signaling bells upon telephone party lines, it is of advantage that all currents, sent out for the selection of one of the stations by ringing its bell while the others are silent, should be pulsating as I have described, and that the circuit should be open at the generator during the undesired half cycle. In other systems it is of advantage that the circuit at the armature should be short circuited during this interval. It is because of these reasons that I effect that feature of the combination which I have made.

Figure 2:
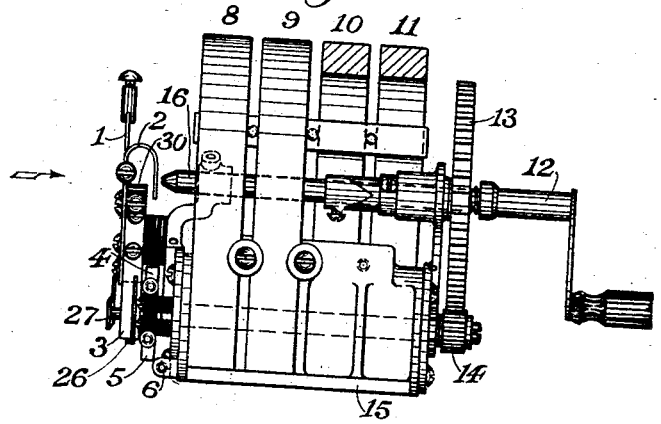
Figure 5:
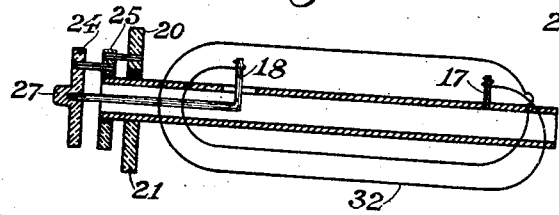
Figures 3, 4:
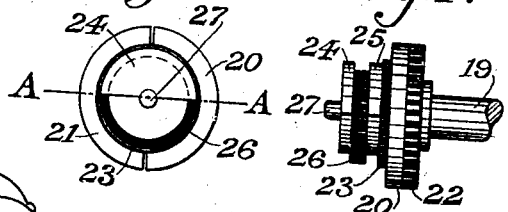
Figure 6:
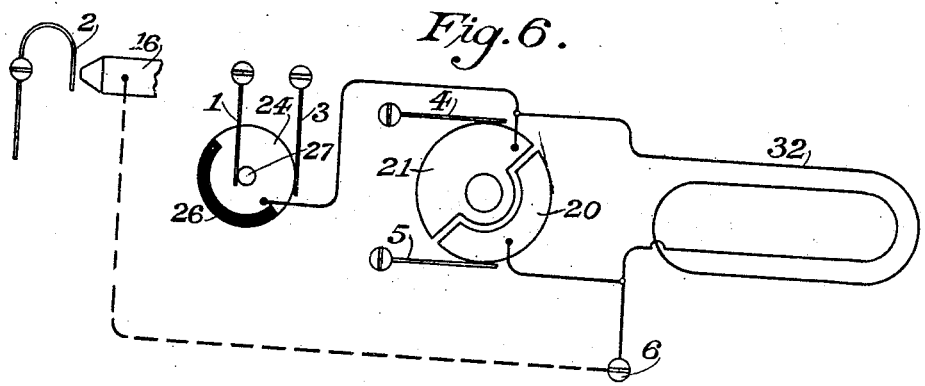

My invention is illustrated in the accompanying drawings, in which:

Figure 1 is an end view of the complete device; Fig. 2 is a side view with two magnets partly cut away; Fig. 3, an end view of the commutator; Fig. 4, a side view of the commutator; Fig. 5, a diagrammatic section of the shaft and commutator, and including a conventional representation of the armature winding, and Fig. 6 is a schematic representation of the complete circuit of the commutator, the armature winding, and the shaft-switch and Fig. 7 shows the circuits of my improved generator in association with an external circuit.

Similar characters refer to similar parts throughout the several views.

Referring first to Fig. 2, 8, 9, 10 and 11 are permanent magnets of the type used in magneto generators. The magnets 10 and 11 are cut away to show the arrangement of the shaft of which the general construction is usual in this art. By means of the shaft 12 and its handle, the large gear wheel, 13, can be rotated, driving the smaller gear wheel or spur 14 at a still higher rate of rotation. The shaft 12, supported in suitable bearings integral with the frame work 15 of the device, is arranged in a manner quite usual, so that upon its rotation in either direction the shaft end 16 will be caused to move in a direction to extend its length, or to the left as viewed in Fig. 2. This extension takes place at the very beginning of the rotation of the handle, and on reaching its maximum, remains so extended until the shaft rotation ceases. The effect is to make contact between the shaft end 16 and the spring contact 2. I shall refer to this contact-making arrangement, which is well-known in practice, as the shaft-switch.

The spur 14 is mounted directly upon the end of the shuttle armature, which in turn is carried in bearings to enable it to rotate freely between and very close to the iron or steel pole pieces upon which the magnets 8 to 11 are clamped. This armature, the pole pieces, and the permanent magnets, are of types quite usual in generators now in use, as is true also of all that I have described so far with reference to Fig. 2.

The end of the armature shaft not fitted with the spur 14, extends beyond its bearing in the framework of the generator. Within the armature the two terminals of the winding are connected to studs, one being electrically mounted in the shaft itself as shown at 17 in Fig. 5. The other is carried out at the end of the shaft, but insulated from it as shown at 18 in Fig. 5. This exit of that terminal from the shaft is at the end opposite to that carrying the spur 14.

The commutator, which is borne on the left end of the shaft as viewed in Fig. 2, is shown in an enlarged and clearer form, disassociated from the springs or brushes which bear upon it, in Fig. 4. The shaft 19 is shown only in part. The segment 20, and disassociated segment 21 shown in Fig. 3, but not visible in Fig. 4, together form a circle, segment 20 being insulated from the shaft and from other segments by the insulating disks 22 and 23, and segment 21 being of the form shown in Fig. 6 and being mounted rigidly upon the shaft 19 as shown in that figure.

The segments 24 and 25 are of similar diameter and formation, being not complete disks, but of the form indicated more clearly in the illustration of the segment 24 in Fig. 3. A portion of the outer edge of each segment 24 and 25, is cut away through half the circumference. An insulating segment 26 is carried between the segments 24 and 25, a half ring of the outer edge of this segment being also cut away quite as is the case in the segments between which 26 is embraced. The angular relation of the three segments 24, 25 and 26, is such that the larger half circumference of 26 coincides with the smaller half circumferences of 24 and 25.
The stud 27 is carried by and in electrical contact with the center of the segment 24.

By reference to Fig. 5, the electrical relations of the various parts of the commutator may be seen together with the connections between these parts and the armature winding. This figure is a diagrammatic section assumed to be taken on the line A A of Fig. 3. As the stud 17 within the armature has one end of the winding connected with it and is itself connected to the armature shaft, the half segment 21 of the commutator is also connected to that end of the winding. As the stud 18 has one end of the winding connected to it, and is carried through an insulating bushing within the shaft, and terminates in the segment 24, that segment is connected to the winding terminal, as is true of the segments 25 and 20, connected by pins or other suitable means with the segment 24.
When the generator is assembled, taking the form shown in Figs. 1 and 2, the stud 27 integral with the segment 24 is engaged by the brush 1, the segments 24 and 25 are engaged by the brush 3, the segments 20 and 21 are engaged by the brushes 4 and 5.

The brush 1 remains in contact with the stud 27, during all parts of each armature rotation. The brush 3 makes contact with the segments 24 and 25 during half of each armature rotation, being out of contact with either during the other half. This condition of being out of contact with either is assured by the presence of the insulating segment 26, which is of full diameter throughout its half circumference, which is assembled to coincide with the half circumference of reduced diameter of the segments 24 and 25. The brush 3 will thus be held a fixed radial distance from the shaft-center half the time by its contact with segments 24 and 25, and half the time by its segment 26.

The brushes 4 and 5, making contact with the segments 20 and 21, are respectively half the time of revolution in contact with one or the other segment, and, in the manner usual in commutation of currents from an armature of one winding, current of one direction may be taken from the terminals of the brushes 4 and 5.

The brush 2 is supported in such a position as to make contact with the shaft end 16, and constitutes the other element of what I have called this shaft-switch.

Brushes 1, 2 and 3 are supported on an insulating block 30, this block in turn being attached rigidly to the framework of the generator. Brushes 4 and 5 are similarly attached to an insulating block 31, also rigidly attached to the framework of the generator.

Referring now to Fig. 6, the electrical and mechanical relations between the various parts of the circuit of the generator may be seen more clearly. The armature winding 32 is there shown with its connections openly carried to the various elements of the commutator and shaft-switch, with the exception of the hidden segment 25. As this is electrically and mechanically a duplicate of segment 24, no error of conception will be encountered by considering the segment 25 to be identical with the segment 24.

The brush 3 is slotted at its lower end, as is disclosed in Fig. 2. Both of the tongues formed by this slotting are engaged by the segment 26 during a half rotation, and during the other half, one tongue is engaged by the segment 24 and the other by the segment 25. A contact is assured in this manner, and any rocking of the brush 3 into a wrong contact is prevented. Such a wrong contact might take place if the conducting and insulating segments 24 and 26 were side by side, and engaged a single tongue.

It will be seen that because of the similarity of shape of the segments 24, 25 and 26, they may be formed with the same tools at an economy in manufacture.

It will be noted in Fig. 6 that the commutator portion formed of segments 20 and 21 stands with its line of division at right angles to the diameter of segment 24, which limits the half ring of greatest diameter. I indicate this relation in that figure because it is the proper one with the construction and mounting of brushes upon the framework. It will be noticed that the brushes 1 and 3 form points of contact with the commutator at right angles to those of the brushes 4 and 5. With a different angle between these sets of contacts, a different angle between the commutator parts would be required. The diameter of the commutator which coincides with the line of separation between segments 20 and 21, lies in the plane of the turns of the armature winding.

Considering now Fig. 7 with relation to the delivery of current or potential at the various terminal points of my generator, and considering conductor 47 as the external circuit through which it is desired that current shall pass, the following tabulation will make clear just how the currents I have described in the early part of this specification may be drawn from my improved generator while its armature is in rotation, the external circuit 47 of the generator being closed in series with the desired internal circuit of the generator by the closing of two of the operating keys, 41, 42, 43, 44, 45, 46: By keys 41 and 42, an alternating current. By keys 42 and 43, a pulsating current, each pulsation constituting a half-cycle and the interval of the remaining half-cycle between pulsations being an interval having an open internal generator circuit and therefore leaving the external circuit 47 open. By keys 42 and 44, a pulsating current, each pulsation consisting of a half-cycle and the interval of the remaining half-cycle between pulsations being an interval having a closed internal generator circuit of zero resistance and therefore leaving the external circuit 47 short-circuited. By keys 42 and 45, a pulsating current as last described, short-circuiting the external circuit 47 during the intervals, but with the current of the pulsations flowing in the opposite direction. By keys 44 and 46, a uni-directional current; a rectified alternating or sine-wave current, consisting of successive impulses in the same direction and without half-cycle intervals between pulsations.

Having thus described my invention, what I claim as new and desire to secure by United States Letters Patent is:

1. In a commutator for magneto electric generators, two semi-circular segments of which the joint periphery forms a circle about a shaft, two conducting circular segments having a reduced diameter through half of the circumference, and an insulating circular segment of similarly reduced diameter through the half circumference, embraced between said two conducting circular segments, substantially as described.

2. In a commutator for magneto electric generators, two semi-circular segments of which the joint periphery forms a circle about a shaft, two conducting circular segments having a reduced diameter through half of the circumference, and an insulating circular segment of similarly reduced diameter through the half circumference, embraced between said two conducting circular segments, said conducting circular segments and said insulating circular segments being concentric with the shaft, said conducting circular segments being so related angularly that their reduced half circumferences shall occupy the same angular relation to the shaft, substantially as described.

3. In a commutator for magneto electric generators, two semi-circular segments of which the joint periphery forms a circle about a shaft, two conducting circular segments having a reduced diameter through half of the circumference, and an insulating circular segment of similarly reduced diameter through the half circumference, embraced between said two conducting circular segments, said insulating segment and said conducting segments being concentric with each other and the shaft, said insulating segment being angularly so related to said conducting circular segments that its unreduced half circumference will register with the reduced half circumference of said conducting circular segments, substantially as described.

4. In a commutator for magneto electric generators, a conducting shaft, two semi-circular segments whose periphery forms a circle about said shaft, two conducting circular segments of reduced diameter throughout the half circumference, an insulating circular segment of similar reduced diameter throughout the half circumference, and a stud formed upon and electrically connected to that one of said conducting circular segments which forms the free end of the commutator, said insulating segment being embraced between said conducting circular segments and having its unreduced half in registry with the reduced halves of said two conducting segments, substantially as described.

5. In a commutator for magneto electric generators, a ring of two conducting half circles insulated from each other, two conducting disks with a reduced half circumference, a central stud carried by one of said conducting disks, an insulating disk with a reduced half circumference and embraced between said two conducting disks so as to register its unreduced half circumference with the reduced half circumferences of said conducting disks, two brushes in contact with diametrically opposed portions of the periphery of said ring, a brush maintaining contact with the periphery of said conducting disks during a half rotation of the commutator, and with the periphery of said insulating disk during the other half rotation of the commutator, and a brush maintaining constant contact with said stud, substantially as described.

6. In a magneto electric generator, a shuttle armature and a longitudinal shaft therefor, a winding having turns in planes parallel to said shaft, and one end electrically connected with said shaft, an insulated conducting stem within said shaft and connected to the other end of said winding, two semi-circular commutator segments forming a periphery concentric with said shaft, one of said segments being electrically connected to said shaft, and one insulated therefrom, two conducting disk-like commutator segments, a non-conducting disk-like commutator segment embraced between said conducting disk-like segments, a stud formed upon one of said conducting segments, and electrical connections between said stud, both of said disk-like conducting segments, the second of said semi-circular segments, and said conducting stem, substantially as described.

7. In a magneto electric generator, a shuttle armature and a longitudinal shaft therefor, a winding having turns in planes parallel to said shaft, and one end electrically connected with said shaft, an insulated conducting stem within said shaft and connected to the other end of said winding, two semi-circular commutator segments forming a periphery concentric with said shaft, one of said segments being electrically connected to said shaft, and one insulated therefrom, two conducting disk-like commutator segments, a non-conducting disk-like commutator segment embraced between said conducting disk-like segments, a stud formed upon one of said conducting segments, electrical connections between said stud, both of said disk-like conducting segments, the second of said semi-circular segments, and said conducting stem, a brush normally engaging said stud, a brush engaging said disk-like conducting segments during a half rotation of the armature and engaging said disk-like insulating segment during the other half rotation, and a pair of brushes embracing the periphery formed by said semi-circular segments, substantially as described.

Signed by me at Menominee, county of Menominee and State of Michigan, in the presence of two witnesses.

HENRY TIDEMAN.

Witnesses:
L. JACKMAN,
A. J. NANGLE.